United States Patent
Frank

(10) Patent No.: US 8,246,092 B2
(45) Date of Patent: Aug. 21, 2012

(54) PROFILED ELEMENT FOR FASTENING A BUMPER TO LONGITUDINAL BEAMS OF A VEHICLE, AND METHOD THEREFOR

(75) Inventor: Simon Frank, Tengen/Watterdingen (DE)

(73) Assignee: GM Global Technology Operations LLC, Detroit, MI (US)

( * ) Notice: Subject to any disclaimer, the term of this patent is extended or adjusted under 35 U.S.C. 154(b) by 258 days.

(21) Appl. No.: 12/298,717

(22) PCT Filed: Apr. 17, 2007

(86) PCT No.: PCT/EP2007/003375
§ 371 (c)(1),
(2), (4) Date: Jan. 22, 2010

(87) PCT Pub. No.: WO2007/121896
PCT Pub. Date: Nov. 1, 2007

(65) Prior Publication Data
US 2010/0148527 A1    Jun. 17, 2010

(30) Foreign Application Priority Data

Apr. 25, 2006  (DE) .................. 10 2006 019 654
Apr. 25, 2006  (DE) .................. 10 2006 040 178

(51) Int. Cl.
*B60R 19/34* (2006.01)
(52) U.S. Cl. ........................... 293/155; 293/133
(58) Field of Classification Search .......... 293/132, 293/133, 155; 296/187.03, 187.09, 187.11, 296/203.01, 203.02, 204, 205, 30
See application file for complete search history.

(56) References Cited

U.S. PATENT DOCUMENTS

| 4,563,028 A | 1/1986 | Ogawa et al. |
| 5,080,410 A | 1/1992 | Stewart et al. |
| 5,725,267 A | 3/1998 | Grosser et al. |
| 7,066,509 B2 * | 6/2006 | Kollaritsch et al. ........... 293/133 |

(Continued)

FOREIGN PATENT DOCUMENTS
DE    4238631 A1    5/1994
(Continued)

OTHER PUBLICATIONS

German Patent Office, German Office Action for Application No. 102006040178.6, dated Dec. 12, 2006.
(Continued)

*Primary Examiner* — Glenn Dayoan
*Assistant Examiner* — Gregory Blankenship
(74) *Attorney, Agent, or Firm* — Ingrassia Fisher & Lorenz, P.C.

(57) ABSTRACT

Disclosed is a profiled element (66) which is designed as a hollow profiled support section and is used for fastening a bumper to longitudinal beams (30) of a vehicle. Said profiled element (66) is assigned to a longitudinal beam (30) made of steel as an insertable section for the interior (32) of the longitudinal beam (30). The final edge (67) of at least two opposite walls (68) of the insertable section of the profiled element (66), which is made of a light metal material, is attached inside an insertion member (70) which, as a separation layer, prevents adjacent surfaces that are made of light metal and iron-carbon alloys from corroding. The insertable section is inserted into the longitudinal beam (30) along with the insertion members (70).

13 Claims, 4 Drawing Sheets

U.S. PATENT DOCUMENTS

| | | | |
|---|---|---|---|
| 7,188,877 B2 * | 3/2007 | Gonzalez et al. | 293/133 |
| 7,192,067 B2 * | 3/2007 | Hansen | 293/133 |
| 7,407,206 B2 | 8/2008 | Arns et al. | |
| 7,503,603 B2 * | 3/2009 | Braunbeck et al. | 293/133 |

FOREIGN PATENT DOCUMENTS

| | | | |
|---|---|---|---|
| DE | 29823973 U1 | 3/2000 | |
| DE | 102004060088 B3 | 2/2006 | |
| EP | 0718158 A1 | 6/1996 | |
| EP | 0894675 A1 | 2/1999 | |
| EP | 1079992 A1 | 3/2001 | |
| EP | 1342625 A1 | 9/2003 | |
| EP | 1862377 A2 | 12/2007 | |
| FR | 2876645 A1 | 4/2006 | |
| SU | 1444366 A1 | 12/1988 | |

OTHER PUBLICATIONS

German Patent Office, German Office Action for Application No. 102006019654.6, dated Dec. 13, 2006.
ISA European Patent Office, International Search Report for Application No. PCT/EP2007/003375, dated Nov. 19, 2008.

* cited by examiner

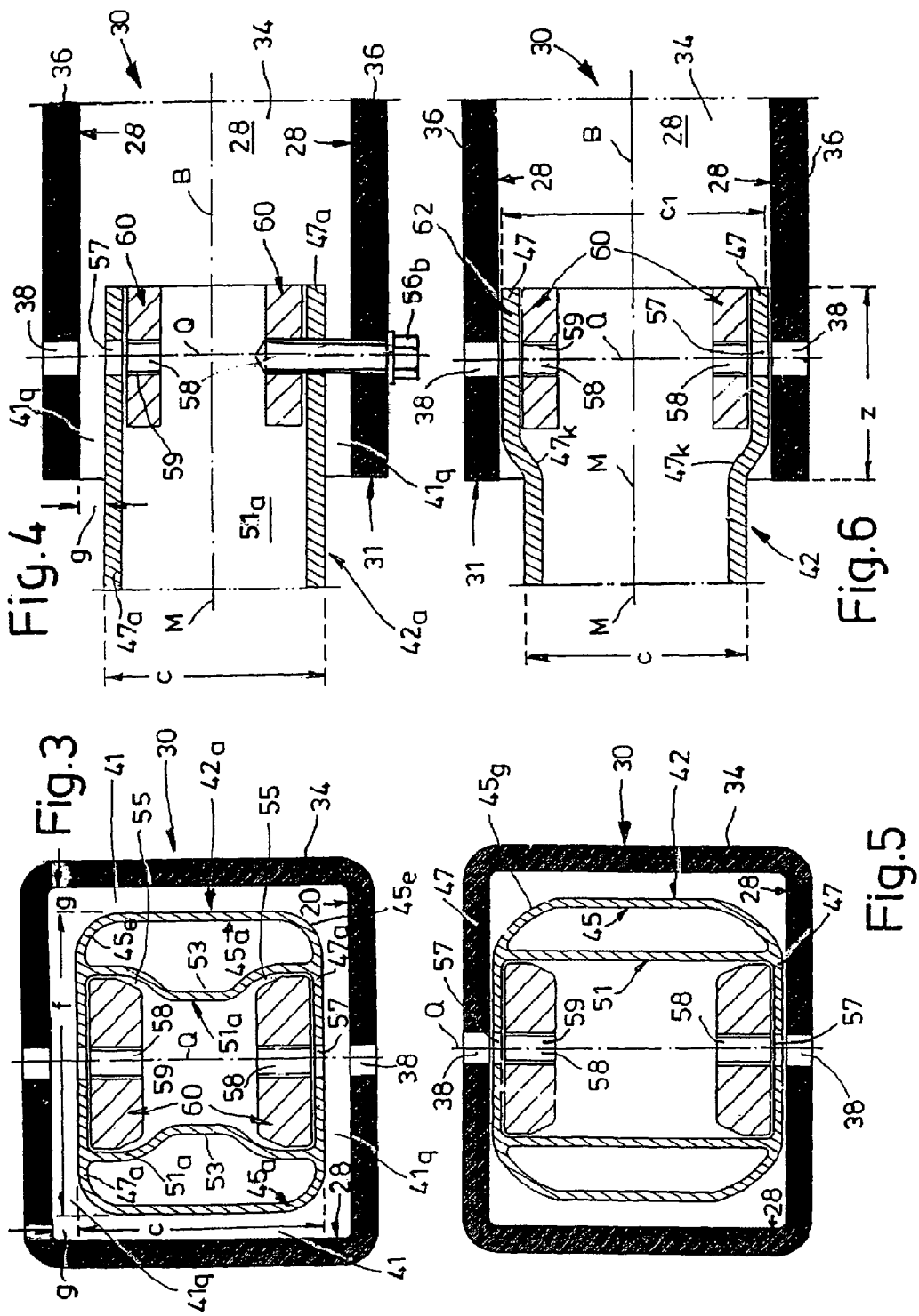

PROFILED ELEMENT FOR FASTENING A BUMPER TO LONGITUDINAL BEAMS OF A VEHICLE, AND METHOD THEREFOR

CROSS-REFERENCE TO RELATED APPLICATIONS

This application is a U.S. National-Stage entry under 35 U.S.C. §371 based on International Application No. PCT/EP2007/003375, filed Apr. 17, 2007, which was published under PCT Article 21(2), and claims priority to German Application Nos. 102006019654.6, filed Apr. 25, 2006, and claims priority to German Application No. 102006040178.6, filed Apr. 25, 2006, which are all hereby incorporated in their entirety by reference.

TECHNICAL FIELD

The invention relates to a profiled element for fastening a bumper to longitudinal beams of a vehicle; the profiled element is embodied as a profile containing at least one side wall and two transverse walls adjoining said side wall with a hollow profile beam section which is assigned to a longitudinal beam made of steel as an insertable section for the interior space of the longitudinal beam. In addition, the invention covers a method for the installation of the profiled element.

BACKGROUND

A device in a vehicle for absorbing impact energy with a fastening beam for a bumper element on the vehicle frame can be taken from EP1 079 992 B1; that fastening beam has at least two walls running in longitudinal direction which are provided with one or several openings in order to accommodate one or several through-bolts. In the event of a collision impact or a vehicle collision the bolts are moved along predetermined lines relative to the respective energy-absorbing walls of the fastening beam and/or the vehicle frame and/or the bumper in order to enlarge those openings subject to the formation of strips. To this end, the bolts are designed so that they shear off the wall material in order to enlarge or elongate the openings in the energy-absorbing wall.

A bumper with the plate-like holders crossing the longitudinal axis of its longitudinal beam is described in EP0 718 158 B1 with the reference that in addition to the cross-sectional shape of the bumper the embodiment of the connection to the vehicle longitudinal beam also influences the shape retention capability of said bumper as well as its compensating capacity for the impacting deformation energy.

For fastening the bumper to the vehicle a multiplicity of holders are known. For example, from U.S. Pat. No. 5,080,410 or U.S. Pat. No. 4,563,028, but which are hardly able to improve the shape retention capability of a bumper upon an impact.

In EP0 894 675 A1 a bumper arrangement is described, wherein the holding elements of the bumper expand conically and thus its outer walls come to hug the profile wall of the bumper or merge with said profile wall of the bumper.

With DE 298 23 973 U1 particularly light bumpers are proposed which, in severely loaded regions, are reinforced by an additional profile. Here, the reinforcement profile can also consist of a part of a holding device for the bumper. In the latter case the side walls of the holding device expand conically and come hug the profile strips of the bumper.

Knowing these circumstances the inventor has made it his objective to create a bumper of the type mentioned at the outset which with low weight comprises a high degree of shape retention with adequate compensation capacity for the impacting deformation energy, i.e. an efficient energy absorption element is created. Manufacture and handling of the bumper as well as the profiled element are to be very simple and the longitudinal beam forces are to be lower as well as central. In addition, there is the object of compensating the influence of the various materials on one another; the corrosion between a profiled element or a crashbox of aluminum and a longitudinal steel beam must be prevented. In addition, the inaccuracy of the components during the joining process is to be compensated and a relatively large gap between crashbox and longitudinal beam is to be closed.

The teaching of the independent claim leads to the solution of this object; the subclaims state favorable further developments. The scope of the invention additionally comprises all combinations of at least two characteristics disclosed in the description, the drawing and/or the claims. With stated designation regions, values located within the mentioned limits are to be disclosed as limit values and applicable as desired.

SUMMARY

According to an embodiment of the invention, walls of the insertable section of the profiled element formed from a light metal material are arranged with its final edge in an insertion member with material preventing corrosion on adjacent surfaces of light metal alloys on the one hand and iron-carbon alloys on the other hand, and the insertable section is inserted in the longitudinal beam with the insertion members.

This profiled element formed of light metal material can also comprise a lesser cross section than the longitudinal beam which with at least two of its inner surfaces towards the profiled element limit a gap space each; in addition, at least two walls of the insertable section following its insertion in the longitudinal beam are embodied deformable towards the inner surfaces of said longitudinal beam and fixable to these.

Said insertion member with surface coatings of corrosion protection agent, for example of non-metal material, forms a protective or separating layer between the light metal or aluminum material of the profiled element on the one hand and the ferrous longitudinal beam on the other hand in order to stop corrosion damages. The surface can have been treated through alitizing, anodizing, sherardizing, chromizing, phosphatizing, enameling, lead-plating, tin-plating, copper-plating and similar coating methods or through plating, metal spraying methods, hot dipping, galvanizing and the like. Solid corrosion protection agents can be applied through gluing and wrapping of bands or films through rolling-on, pressing and the like, through applying of paints by painting on with spray-on, roll-on or brush-on compounds such as lacquers or varnishes or by melting-on of melting compounds for protective skins and fluidized bed coating.

It has proved to be favorable if the profiled element on at least two walls located opposite each other is provided with an insertion member enclosing a wall region each and fixes said insertion member against the wall. This insertion member is to comprise two wall plates resting against both surfaces of the wall which are connected through a groove web subject to the formation of an interior space; the width of the interior space approximately corresponds to the thickness of the wall of the profiled element and the groove web in installation position is to form a stop for the final edge of the insertable section.

According to a further embodiment of the invention, the outer wall plate is provided with two lateral strips which run outside the lateral edges of the inner wall plate and below the groove web comprise lugs inclined towards the interior space of the insertable section and serving as insertion aids, which are each preferably inclined at an angle of approximately 30° relative to the wall surface.

Advantageously, a nut fixed to the outer surface of the inner wall plate, preferably approximately at the middle of the height of said wall plate, is assigned to each lateral edge with the screw penetration for accommodating a profiled element and screw securely connecting the insertion member of which a perforation in the outer wall plate is in alignment.

With another embodiment of the insertion member according to an embodiment of the invention, cantilever elements, more preferably ring-like shaped collars, are molded out of the inner wall of said insertion member and inserted in the inner perforations of the wall of the insertion member in order to closely join said insertion member with the wall plate.

According to an embodiment of the invention, at least one lug-like strap laterally cantilevered from the outer wall of the insertion member is additionally molded to the upper edge of said outer wall of the insertion members, which in installation position rests on a corresponding lateral molding of the longitudinal beam and is capable of being joined with the latter through spot welding; the longitudinal member to this end comprises lateral termination wings at its face edge and the straps of the insertion member that can be placed on these are welded to these.

With a particular embodiment the wall plates of the insertion member and the walls of the profiled element hugging their insides are joined by at least one rivet as additional fixing element, which after the fastening of the screws can also be removed again.

It is within the scope of the invention that two parallel walls of the longitudinal beam comprising two perforations arranged in alignment with each other are each located opposite walls of a profiled element with perforations at a distance; these perforations of longitudinal beam and profiled element determine a common center axis with threaded perforations of two material strips each of which is assigned on the inside to the walls of the profiled element. These material strips are preferably of square or hexagonal cross section.

In this case the insertion of the profiled element or the crashbox in the longitudinal beam is simplified since the crashbox is cross-sectionally considerably smaller than the longitudinal beam; according to the invention the lateral walls and the transverse walls of the longitudinal beam with the side walls and the transverse walls of the profiled elements connecting the longitudinal beam each delimit gap spaces, i.e. spacing regions. With this profiled element an inner wall is assigned each at a distance to the two lateral walls in the interior space of the profiled element which on both ends are molded to the transverse walls and into which approximately in its longitudinal middle a groove region shortening its cross section is molded. This groove region with the following transverse wall of the profiled element is to delimit an accommodation space for one of the material strips which according to the invention lies flat against the transverse wall of the profiled element assigned to the inner surface at least in the region of the insertable section.

In order to be able to guide the transverse wall of the profiled element against the longitudinal beam the perforations of neighboring walls of the two system parts are penetratable by a tensile screw which engages in the thread of the thread perforation of the material strip hugging the inside and is mounted in a rotatable manner in said thread. By tightening the tensile screw towards the longitudinal beam the region of the transverse wall behind which the material strip engages is deformed until the deformed profiled element with the regions of its transverse walls deformed to the outside parallel to its center line hugs the inner surfaces of the neighboring walls of the longitudinal beam. Advantageously the two transverse walls of the profiled element then merge into the region deformed to the outside at an integrated curved region, and the inner walls in a deformed state now comprise a linear cross section. The method according to the invention for the installation of the profiled element comprises that in the thread perforation of the material strip a tension screw penetrating the profiled element and the longitudinal beam is inserted and said tension screw through rotation is pulled with the material strip to the transverse wall of the longitudinal beam; as mentioned, the transverse wall of the profiled element is placed against the transverse wall of the longitudinal beam and the cross section of the two inner walls appended to the transverse wall of the profiled element is linearly molded-out through stretching its groove region.

According to an embodiment of the invention, an insertion member with corrosion protection layer is thus attached to the crashbox which prevents that the steel longitudinal beam and the crashbox come into contact. The insertion member of steel plate is embodied with a bevel towards the end which during the joining process facilitates the insertion of the crashbox in the longitudinal beam. The crashbox wall is enclosed by steel plate. On its inner side at least one nut is fastened. When the crashbox is screwed tight the outer wall of the aluminum profile is pulled against the longitudinal beam. The bent aluminum webs are stretched and the joining gap between crashbox and longitudinal beam is closed.

BRIEF DESCRIPTION OF THE DRAWINGS

The present invention will hereinafter be described in conjunction with the following drawing figures, wherein like numerals denote like elements.

FIG. 3 and FIG. 4 are a cross section through a longitudinal beam with profiled element as holder inserted in said longitudinal beam or a partial longitudinal section thereto;

FIG. 5 and FIG. 6 are a cross section through the longitudinal beam after the change of the profiled member inserted as holder or the part longitudinal section thereto;

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
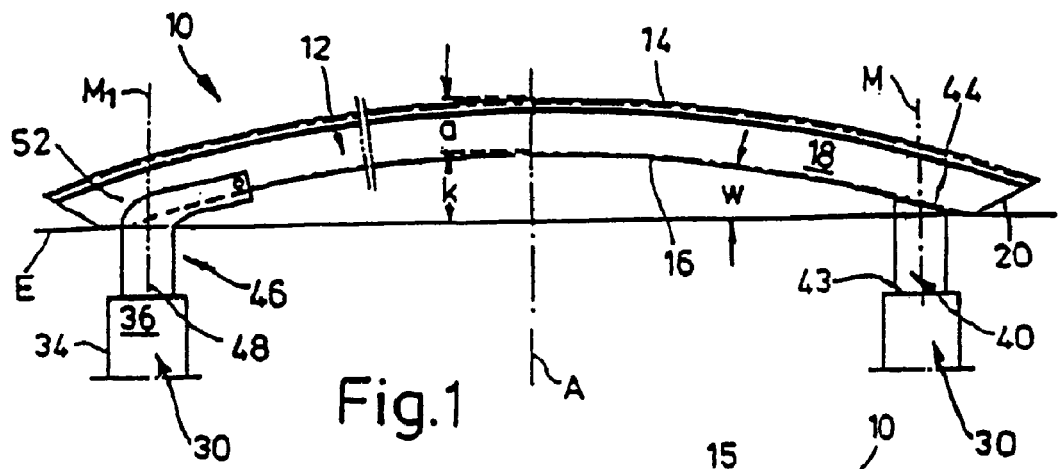
FIG. 1 is the top view of a bumper with holders according to the state of the art embodied differently on both ends of the bumper for connection to a longitudinal beam.

A bumper 10 extruded from an aluminum alloy for a passenger car which is not reproduced for the sake of clarity according to FIG. 1 comprises a box-shaped hollow profile 12 with two profile walls 14, 16 running at a distance a to each other, which are connected by two transverse or flank walls 18. The hollow profile 12 is assigned to a transverse plane E, running at a right angle to the vehicle longitudinal axis indicated at A, and on both sides of the vehicle longitudinal axis A here forming a symmetry plane evenly curved towards said transverse plane E; towards the latter the hollow profile 12 in the longitudinal axis A located in the curvature zenith determines a curvature dimension k. In installation position the outer profile wall 14 facing away from the transverse plane E forms a shock forces absorbing outer or compression belt the other, inner, profile wall 14, an inner or tension belt.

Here, the bumper 10 is assigned to a pair of vehicle longitudinal members 30 of rectangular cross section molded of steel, which run on both sides parallel to the vehicle longitudinal axis A. These in turn are composed of two parallel side walls 34 and transverse walls 36 connecting these, which delimit an interior space 32 of the vehicle longitudinal beam 30.

Near the right face edge 20 of the hollow profile 12 on the right-hand side in FIG. 1 a tubular deformation element 40 of a profile piece is indicated, which on one end is attached to the inner profile wall 16 and on the other end is assigned to the vehicle longitudinal beam 30 with an insertable section 43. The deformation element 40 also designated crashbox is likewise manufactured from a profiled element extruded from light metal and at the end facing the bumper 10 is beveled transversely to the center line M of the deformation element 40; the beveled edge 44 of the profiled element 40 so created determines an angle w of approximately 10° with the transverse plane E.

Figure 2:
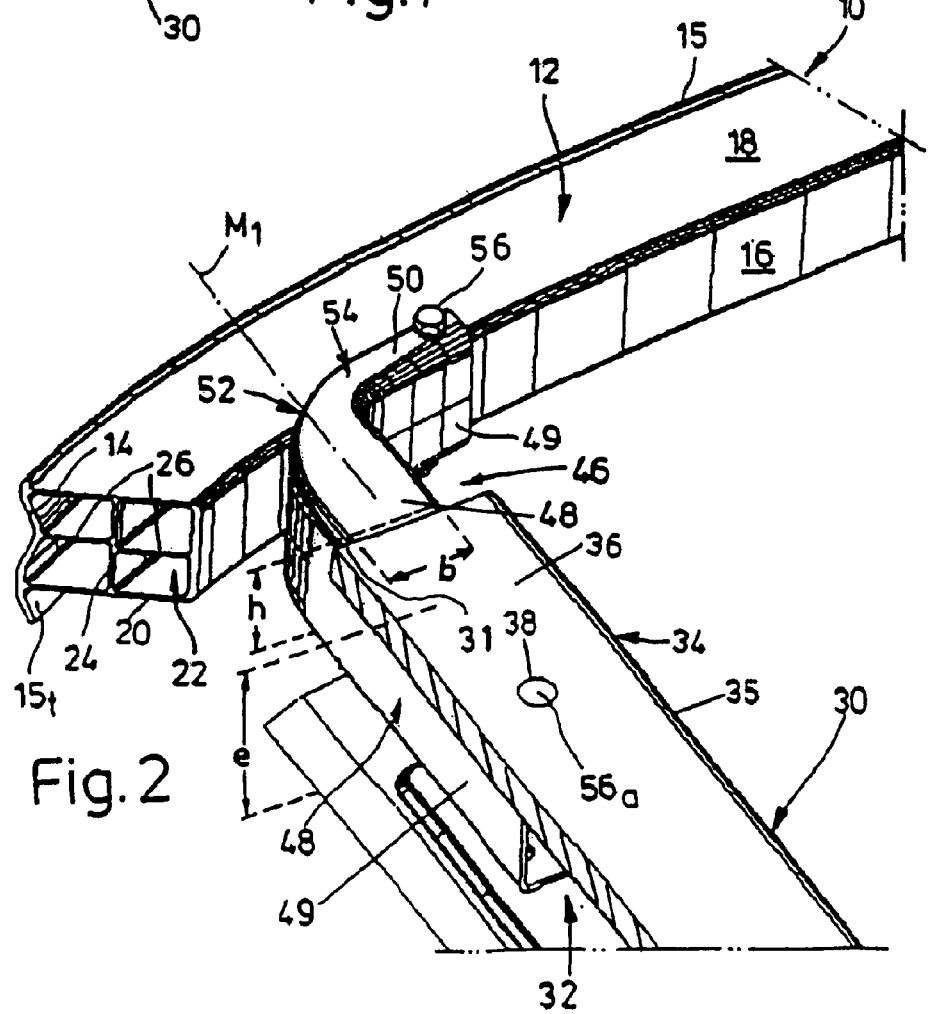
FIG. 2 is an inclined view of a part of the bumper with holder enlarged compared with FIG. 1.

Another embodiment of the connection of the hollow profile 12 to the vehicle longitudinal member 30 is sketched on the left end in FIG. 1 of the bumper 10 and shown in FIG. 2. It becomes clear here that the profile wall 14 which serves as outer belt, in itself embodied wave-like in terms of cross section, engages over both transverse or flank walls 18 with wing-like wall sections as edge strips 15, 15*t*. From FIG. 2 it is also evident that the side wall 34 of the vehicle longitudinal beam 30 likewise protrudes over the outer surface of the joined-on transverse wall 36 with an edge strip 35. Otherwise, the second side wall 34 is not drawn in here for the sake of clarity, its fastening region is emphasized hatched.

In the profile interior space 22 of the hollow profile 12 a transverse wall 24, directed parallel to the profile walls 14, 16, each with a middle wall 26 running between said transverse wall and the profile walls 14, 16 is provided in one piece with the profile walls 14, 16 and the flank walls 18 connecting said profile walls. These middle walls 26 are noticeably offset vertically and laterally relative to each other.

The connection of the hollow profile 12 to the vehicle longitudinal beam 30 is established here through a holding link 46 in turn embodied of an extruded aluminum alloy hollow profile of width b of for example 55 mm and the height h of 75 mm. This holding link the insertable section 48 of said holding link assigned to and screwed into the vehicle longitudinal beam 30 of the profile height e and its face edge 31 of approximately rectangular cross section, of two parallel side walls 49 and transverse walls 50 of the hollow profile of the holder 46 joining these, is followed by a curved section 52; the in FIG. 2 right side wall 49 is curved outward, that is here from the longitudinal axis M1 of the insertable section 48 to the right, and the other side wall 49 endwards guided against the former so that both side walls 49 rest on top of each other and each of the two transverse walls 50 is folded approximately in its longitudinal center. The inner curvature contour runs in accordance with the outer surface of the inner profile wall 16 of the hollow profile 12, i.e., it encloses the mentioned angle w with a parallel line to the transverse plane E.

The double-layer legs 54 of the groove-like curved section 52 so created are penetrated by screws 56 or similar connecting elements in the region of perforations—not evident in the drawing, which additionally engage in perforations of the flank walls 18 on the bumper side. Corresponding perforations for connecting elements 56*a* are provided in the insertable section 48 of the holding link 46. These connecting elements 56*a* are mounted in perforations 38 in the vehicle longitudinal beam 30.

A profiled element or a crashbox 42*a* substantially of rectangular cross section of two side walls 45*a* and two transverse walls 47*a* of the wall lengths c,f connecting these is inserted in the longitudinal beam 30 of FIGS. 3,4. The transitions of the side walls 45*a* to the transverse walls 47*a* form corner regions 45*e* curved in the form of pitch circles.

To simplify the insertion process, the side walls 45*a*, 47*a* each run at a distance g to the neighboring interior space surface 28 of the side walls 34 as well as the transverse walls 36 of the longitudinal beam 30 subject to the formation of gap spaces 41 and 41*q*.

In the profiled element 42*a* an inner wall 51*a* is set in front on the inside of each side wall 45*a* which on both ends is molded onto the transverse walls 47*a* and at a distance to these offers a groove-like cross section. On each molded-on region is located a mounting space 55, determined by the groove region 53 of the inner wall 51, for a material strip 60 of hexagonal solid cross section mounted therein. The latter is equipped with a thread perforation 58 which is in alignment with a perforation 57 of the neighboring transverse wall 47*a* and the perforation 38 in the longitudinal beam 30.

In FIG. 4, the centerline M of the profiled element 42*a* is in alignment with the longitudinal axis B of the surrounding longitudinal member 30. The transverse walls 47*a* of the profiled element 42*a* positioned at said distance g to the inner surfaces 28 of the longitudinal member 30 run noticeably parallel to the axis. The lined-up perforations 38, 57, 58 of the one system side with the perforations 58, 57, 38 of the other system side determine a common center axis Q and accommodate a tensile screw 56*b* indicated in FIG. 4 each, which towards the end is screwed together with the thread 59 of the thread perforation 58 and subject to deformation of the profiled element 42*a* pulls the transverse wall 47*a* of said profiled element including the material strip 60 against the neighboring side wall 34 of the longitudinal beam 30. The profiled element 42 sketched in FIG. 5, 6 is created through this deformation.

This profiled element 42 in FIGS. 5,6, thanks to the bending process that has taken place, instead of those bent inner walls 51*a* of FIG. 3 towards the side walls 45 to the center axis Q, comprises inner walls 51 parallel to the axis so that the regions 47 of the transverse walls raised by this directly rest against the inner surfaces 28 of the longitudinal member 30 here and their outer distance C1 approximately corresponds to the width of the profiled element 42, which according to FIG. 6, thanks to a curved region 47*k*, is reduced to the wall length c mentioned in FIG. 3. Thus is created within the longitudinal beam 30, an insertable section 62 of axial length z hugging said longitudinal beam on both sides. The two side walls 45 which are parallel to the center axis Q which merge with corner regions 45*g*, which are more stretched compared with FIG. 3, to form the adjoining transverse walls 47, maintain the gap distance g to the inner surface 28 of the longitudinal member 30.

Figure 7:
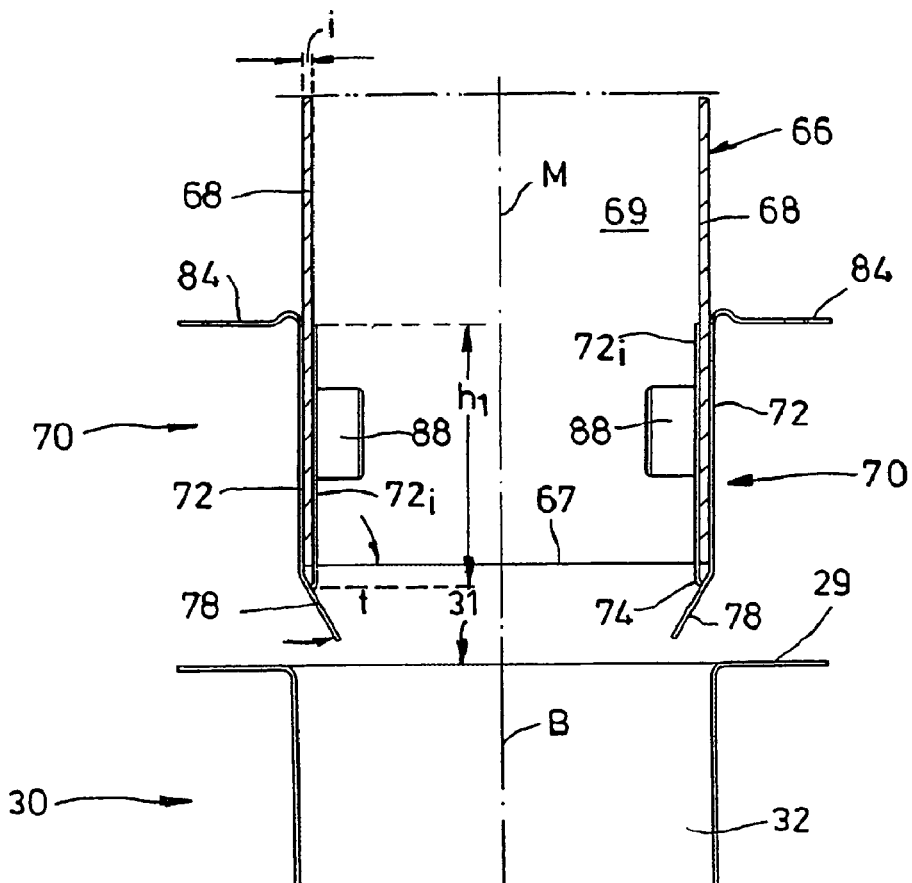
FIG. 7 is a sketch of a partially reproduced longitudinal beam with profiled member arranged at a distance and comprising insertion aids.
Figure 8:
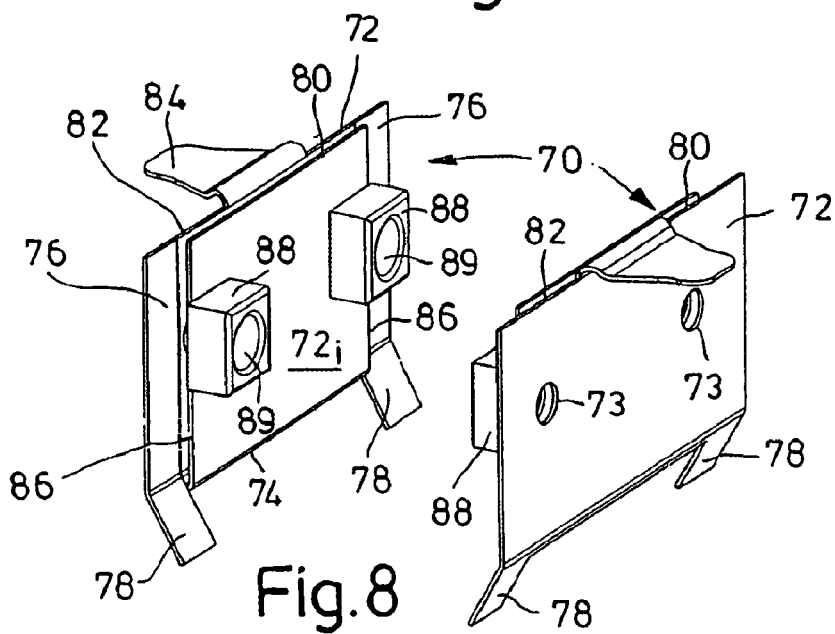
FIG. 8 is an inclined view of a pair of insertion aids.
Figure 9:
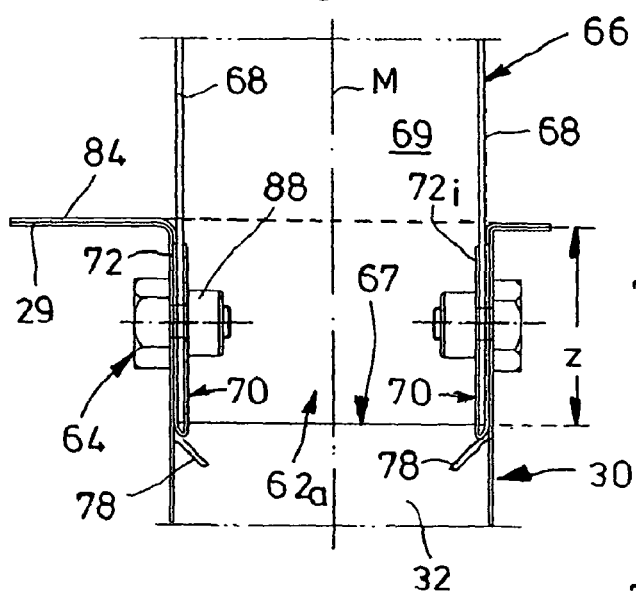
FIG. 9 is the details of FIG. 7 following the assembly.

A particular construction is evident in FIGS. 7, 8. Since longitudinal beam 30 and profiled elements have to be automatically joined and spot-welded in the body in white construction, the following problems might arise among others.
   a) Inaccuracy of the component dimensioning during the joining process has to be compensated;
   b) Corrosion must be prevented between the crashbox of aluminum material and the steel longitudinal beam;
   c) The profiled element formed from an aluminum alloy and the longitudinal beam have to be joined by spot welding; and/or
   d) The large gap between profile wall and longitudinal member has to be closed.

In order to create a solution here an insertion member 70 of steel plate with corrosion protection layer, a protective paint or a foil—is provided on the profiled element or the rectangular crashbox 66 of FIG. 7; the latter prevents that the steel longitudinal beam 30 and the aluminum material of the parallel crashbox walls 68, joined by transverse walls 69, come into contact.

As is especially evident from FIG. 8 the insertion member 70 has a cross sectionally U-shaped body of two parallel wall plates 72, 72i, which are connected by a lower groove web 74, which runs transversely to the center line M in installation position, and delimit an interior space 80. Its width approximately corresponds to the thickness i of the wall 68 of the crashbox 66.

The outer wall plate 72 contains two lateral strips 76 which are parallel to each other, which run outside the lateral edges 86 of the inner wall plate 72i as well as are inclined endwards to said wall plate and comprise lugs 78 which protrude over the groove molding 74. Here, the inclination angle t between the lug 78 and the wall surface of the wall plate 72 measures approximately 30°. These lugs 78 facilitate the insertion of the crashbox 66 mounted in the interior space 80 of the insertion member 70 in the longitudinal beam 30, i.e., its parallel walls 68 are each enclosed by the steel plate.

From the upper edge 82 of the outer wall plate 72 there protrudes a way to the outside a lug-like strap 84 molded on to said wall plate and on the inner wall plate 72i two nuts (88) are fixed at half height h1 each assigned to one of its lateral edges 86. Its central screw perforation 89 is aligned with a perforation 73 in the outer wall plate 72.

The crashbox 66 is lowered coaxially into the longitudinal beam 30 with the end region serving as insertable section 62a of axial length z; the crashbox 66 serves as insertion aid while the four lugs 78 of the insertion member 70 constitute additional insertion aids.

In order to guarantee a fixed connection between crashbox 66 and longitudinal beam 30 the insertion member 70 and the crashbox 66 must also be joined through a fixed connection. To this end, the latter is provided with screws 64 protruding into the nuts 88. This unit is then pushed into the longitudinal beam 30 and spot-welded to the latter, i.e., the straps 84 are joined with lateral termination wings 29 of the longitudinal beams 30 through spot-welding. The screws 64 are now actuated which pull the outer wall plate 72 of the insertion member 70 against the longitudinal beam 30. The bent webs of aluminum material are stretched and the joining gap between crashbox 66 and longitudinal beam 30 is closed.

Before screwing the crashbox 66 to the longitudinal beam 30, the vehicle body is coated with substrate system KTL and painted.

FIG. 4 is a sketch of a further embodiment of the connection of an insertion member 70 with the crashbox 66. This insertion member 70 is connected with the wall 68 of the crashbox 66 by means of a metal rivet 90 as fixing aid and can additionally be fixed with screws 64; its nuts 88 are visible at a lateral distance to the rivet 90.

Figure 11:
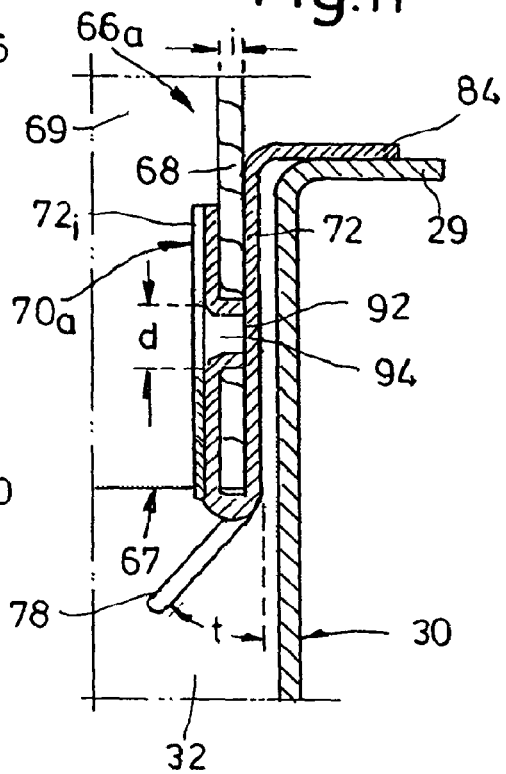
FIG. 11 is an enlarged detail of a further embodiment of an insertion aid.
Figure 10:
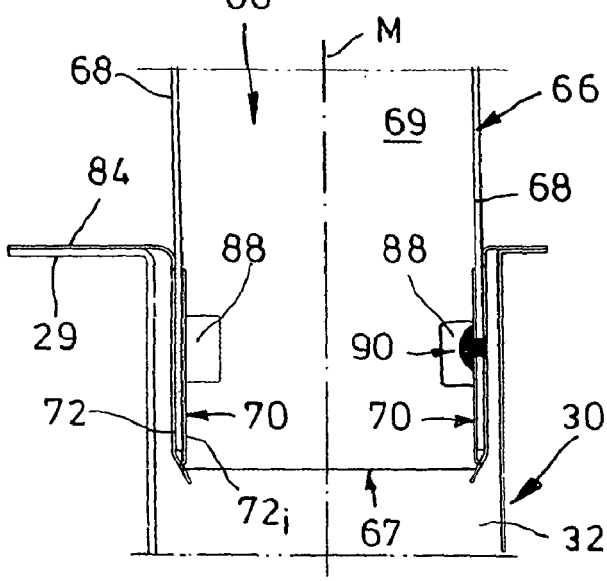
FIG. 10 is a representation of another embodiment of a longitudinal beam corresponding to FIG. 9 with profiled element arranged therein comprising insertion aids.

The wall 68 of the profiled element 66a of FIG. 11 is provided with perforations 92 of diameter d near its end edge 67, in each of which a shaped collar 94 as cantilever element of the inner wall plate 72i of the hugging insertion member 70a is pressed. That shaped collar 94 is created through a punching process and results in a permanent fixation.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A profiled element for fastening a bumper to a longitudinal beam of a vehicle, the longitudinal beam formed of steel, and the profiled element comprising:
   a profile with a hollow profile beam section;
   a side wall of the profile;
   at least two adjoining transverse walls joining the side wall and forming an insertable section for an interior space of the longitudinal beam, the at least two adjoining transverse walls formed of a light metal material, and each of the at least two adjoining transverse walls having a respective end edge, wherein the at least two adjoining transverse walls of the insertable section are arranged in an insertion member having a material that prevents corrosion on neighboring contacting surfaces of a light metal and an iron-carbon alloy, and wherein the insertable section is inserted in the interior space of the longitudinal beam with the insertion member such that the insertion member prevents contact between the at least two adjoining transverse walls and the longitudinal beam; and
   a galvanized steel plate as an outer surface of the insertion member.

2. The profiled element according to claim 1, wherein the insertion member is adapted to form a separating layer between the profiled element and the longitudinal beam.

3. The profiled element according to claim 1, further comprising a coating of corrosion protection agent varnishes as a protective skin applied to the insertion member.

4. The profiled element according to claim 1, wherein the profiled element on at least two opposite walls is provided with the insertion member enclosing a wall region and the insertion member is fixed to the wall.

5. A profiled element for fastening a bumper to a longitudinal beam of a vehicle, the longitudinal beam formed of steel, and the profiled element comprising:
   a profile with a hollow profile beam section;
   a side wall of the profile; and
   at least two adjoining transverse walls joining the side wall and forming an insertable section for an interior space of the longitudinal beam, the at least two adjoining transverse walls formed of a light metal material, and each of the at least two adjoining transverse walls having a respective end edge;
   wherein the at least two adjoining transverse walls of the insertable section are arranged in an insertion member having a material that prevents corrosion on neighboring contacting surfaces of a light metal and an iron-carbon alloy, and wherein the insertable section is inserted in the interior space of the longitudinal beam with the insertion member such that the insertion member prevents contact between the at least two adjoining transverse walls and the longitudinal beam; and wherein the insertion member comprises at least two wall plates hugging both surfaces of each of the at least two adjoining transverse walls, which are connected by a groove web subject to a formation of an interior space.

6. The profiled element according to claim 5, wherein the groove web forms a stop for an end edge of the insertable element.

7. The profiled element according to claim 5, wherein a width of the interior space approximately corresponds to a thickness of the wall of the profiled element.

8. The profiled element according to claim 5, wherein the outer wall plate is provided with at least two lateral strips that run outside lateral edges of the inner wall plate and comprise inwardly inclined lugs below the groove web.

9. The profiled element according to claim 8, wherein lug each of the inwardly inclined lugs is inclined at an angle to the wall surface that is approximately 30°.

10. The profiled element according to claim 5, wherein in a connection position of the insertion member from an inner wall plate cantilever elements protruding out laterally are molded and inserted in corresponding inner perforations of the walls of the insertion member.

11. The profiled element according to claim 5, further comprising a ring-like shaped collar as cantilever element.

12. The profiled element according to claim 5, wherein the longitudinal beam on a face edge is provided with a lateral termination wing and a strap of the insertion member is placeable and weldable.

13. The profiled element according to claim 5, wherein the wall plates of the insertion member and the wall of the profiled element hugging the inner sides of the wall plates are joined by at least one rivet.

* * * * *